US010897888B1

(12) United States Patent
Walker

(10) Patent No.: US 10,897,888 B1
(45) Date of Patent: Jan. 26, 2021

(54) TURKEY POT CALL SYSTEM

(71) Applicant: Robert E. Walker, Meyersdale, PA (US)

(72) Inventor: Robert E. Walker, Meyersdale, PA (US)

( * ) Notice: Subject to any disclaimer, the term of this patent is extended or adjusted under 35 U.S.C. 154(b) by 0 days.

(21) Appl. No.: 16/455,891

(22) Filed: Jun. 28, 2019

(51) Int. Cl.
*A01M 31/00* (2006.01)

(52) U.S. Cl.
CPC .................................. *A01M 31/004* (2013.01)

(58) Field of Classification Search
CPC ............................ A01M 31/04; A01M 31/004
USPC .................. 446/397, 418, 421, 422
See application file for complete search history.

(56) References Cited

U.S. PATENT DOCUMENTS

| | | | | |
|---|---|---|---|---|
| 2,958,157 A * | 11/1960 | Tannehill | ............ | A01M 31/004 446/397 |
| 4,371,167 A * | 2/1983 | O'Brian | .................. | A63F 9/181 273/161 |
| D311,426 S | 10/1990 | Ytter | | |
| 5,108,427 A * | 4/1992 | Majercik | .................... | A61F 2/14 446/389 |
| 5,178,575 A * | 1/1993 | Koch | ................... | A01M 31/004 446/170 |
| 5,562,521 A * | 10/1996 | Butler | ................. | A01M 31/004 446/397 |
| D417,166 S | 11/1999 | DeGroot | | |
| D425,813 S | 5/2000 | Galfidi, Jr. | | |
| 6,150,913 A * | 11/2000 | Simmons | ................... | A63F 9/16 273/456 |
| 6,443,803 B1 * | 9/2002 | Epple, Jr. | ............ | A01M 31/004 446/397 |
| 6,616,504 B1 * | 9/2003 | Forbes | ................ | A01M 31/004 446/418 |
| 6,676,479 B1 * | 1/2004 | Zimmerman | ....... | A01M 31/004 446/397 |
| D489,017 S | 4/2004 | Atkinson | | |
| 6,872,118 B1 * | 3/2005 | Bishop | ................ | A01M 31/004 446/176 |
| 6,902,463 B2 * | 6/2005 | Vaicunas | ............. | A01M 31/004 446/397 |
| D554,017 S | 10/2007 | Hampton | | |
| 7,785,169 B2 * | 8/2010 | Moss | ................... | A01M 31/004 446/397 |
| 8,147,290 B2 * | 4/2012 | Rydbom | ............. | A01M 31/004 211/69.8 |
| 8,517,792 B1 * | 8/2013 | Foster | ................. | A01M 31/004 446/418 |
| D702,148 S | 4/2014 | Williams | | |
| D741,210 S | 10/2015 | Wagner | | |
| 9,155,296 B2 * | 10/2015 | Moss | ................... | A01M 31/004 |
| 9,578,870 B1 * | 2/2017 | Michel | ............... | A01M 31/004 |
| 10,238,101 B1 * | 3/2019 | Michel | ............... | A01M 31/004 |
| 2005/0070201 A1 * | 3/2005 | Rydbom | ............. | A01M 31/004 446/208 |
| 2005/0170739 A1 * | 8/2005 | Zoellner | ............. | A63H 33/046 446/92 |
| 2006/0040583 A1 * | 2/2006 | Thompson | .......... | A01M 31/004 446/418 |

(Continued)

*Primary Examiner* — Jospeh B Baldori
(74) *Attorney, Agent, or Firm* — Cramer Patent & Design, PLLC; Aaron R. Cramer

(57) ABSTRACT

A turkey call system includes a pot, a sound board and a striking surface which is held together with magnets. A striker contacts the pot to produce a sound that is capable of attracting turkeys.

12 Claims, 5 Drawing Sheets

(56) References Cited

U.S. PATENT DOCUMENTS

| | | | |
|---|---|---|---|
| 2008/0280525 A1* | 11/2008 | Carr .................... | A01M 31/004 446/397 |
| 2010/0022158 A1* | 1/2010 | Kim ..................... | A63H 33/046 446/92 |
| 2010/0151769 A1* | 6/2010 | Coffield .............. | A01M 31/004 446/418 |
| 2011/0065356 A1* | 3/2011 | Blodgett ............. | A01M 31/004 446/397 |
| 2012/0045963 A1* | 2/2012 | Moss .................. | A01M 31/004 446/418 |
| 2014/0106643 A1* | 4/2014 | Powers ............... | A01M 31/004 446/418 |
| 2016/0309700 A1* | 10/2016 | Thomas .............. | A01M 31/004 |

* cited by examiner

TURKEY POT CALL SYSTEM

FIELD OF THE INVENTION

The present invention relates to a turkey pot call system.

BACKGROUND OF THE INVENTION

Hunting is a great pastime enjoyed by millions each year. Whether it be hunting for deer, bear, ducks or turkeys, each season brings excitement to those who anxiously await the arrival of each season.

While there are certain accepted norms for hunting a given animal, each hunter has his or her own preferred method. Oftentimes, these methods involve using a call to induce an animal out of hiding, to illicit a verbal response and/or to entice the animal towards the hunter. While calls can be quite effective when used by an experienced hunter sometimes a given call can become ineffective through repeated use. Essentially, a specific animal exposed to a repeated and identical call may become non-responsive.

Accordingly, there exists a need for a means by which a single call may be modified by a user to create a plurality of call sounds. The development of turkey pot call system fulfills this need.

SUMMARY OF THE INVENTION

It is therefore an object of the present invention to provide a turkey pot call system comprises a pot call which itself includes a pot and a striking surface. The pot provides for a bottom and a side of the call pot. The turkey pot call system also comprises a striker including a striker dowel and a striker head and a circular disc pot magnet coupled at the pot. The pot magnet includes a first ferrous disc attached to a first side of a sound card using the first ferrous disc. The turkey pot call system also comprises a second ferrous disc which is attached to an opposite side of the first side of a sound card and a striking surface magnet attached to the underside of the striking surface at the center line. The striking surface rests within a rabbet formed in the pot at the upper end of the side. The turkey pot call system also comprises an air gap maintained between the second ferrous disc and the striking surface magnet without affecting tonal quality of the sound produced by the striking surface.

The turkey pot call system may provide for reproduction of audible calls for drawing turkeys out from cover during hunting and a pair of multiple sound holes visible along the bottom surface to allow for release of produced sounds. The turkey pot call system also may be made out of various species of wood, plastic or acrylic. The striking surface may be made of slate, glass or crystal.

The circular disc pot magnet may be attached at the pot using adhesive. The sound card may vibrate within the pot cavity to produce variations in sound. The sound card may be made of glass, copper, aluminum or tin. The second ferrous disc may be attached with an adhesive. The striking surface magnet is attached to the underside of the striking surface at the center line using adhesive.

The pot, the sound card, and the striking surface of the turkey pot call system may be held in place only via magnetism produced by the pot magnet and the striking surface magnet while allowing for easy disassembly of the pot, the sound card, and the striking surface of the turkey pot call system. Additionally, the pot, the sound card, and the striking surface of the turkey pot call system may also provide for rapid substitution of the sound cards and the striking surface within the pot to produce different tonal qualities without the need for a different turkey calling device.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
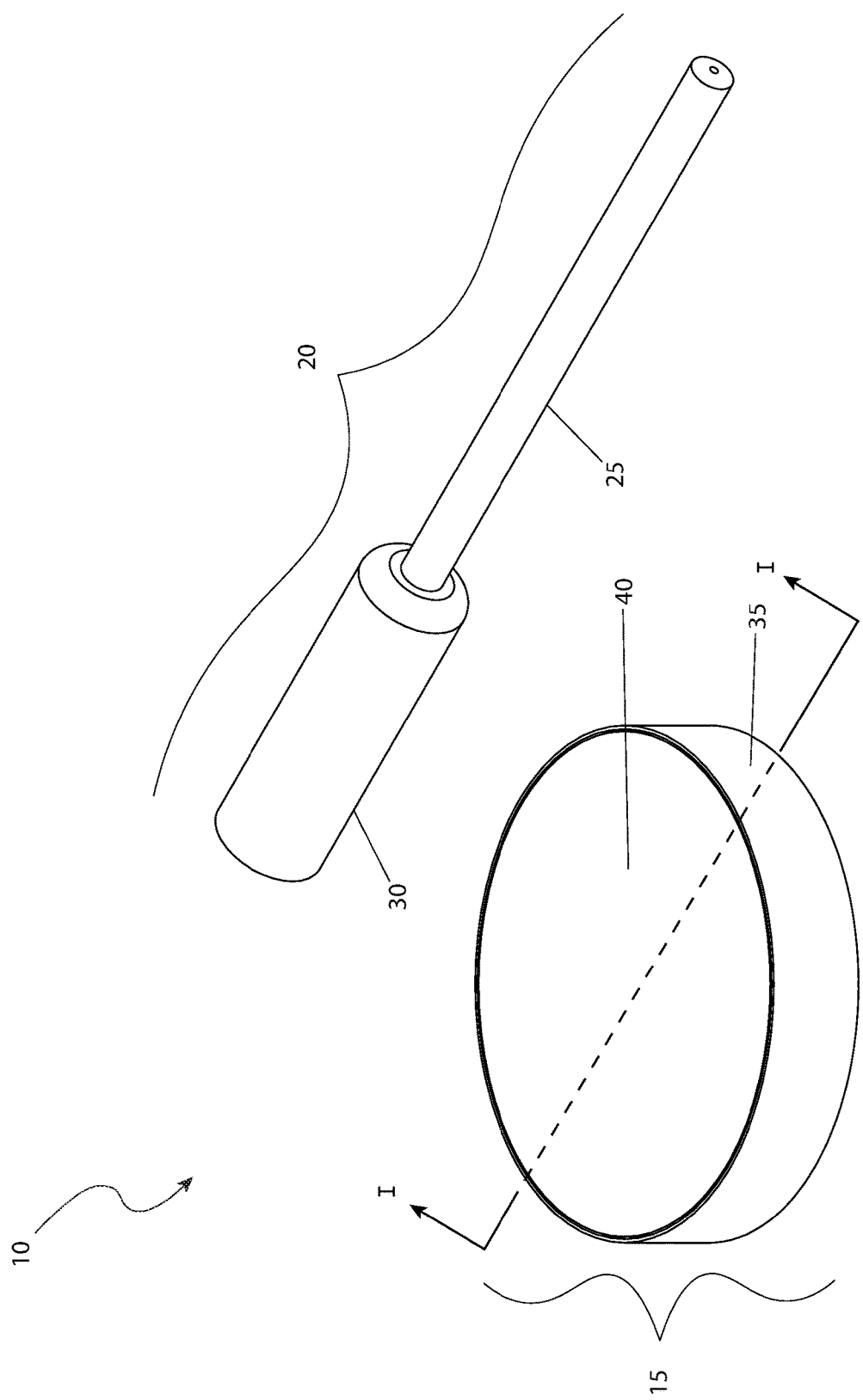
FIG. 1 is a perspective view of the turkey pot call system 10, according to the preferred embodiment of the present invention.

DESCRIPTIVE KEY 10 turkey pot call system
15 pot call
20 striker
25 striker dowel
30 striker head
35 pot
40 striking surface
45 bottom
50 side
55 sound hole
60 pot magnet
65 center line
70 adhesive
75 first ferrous disc
80 sound card
85 pot cavity
90 second ferrous disc
95 striking surface magnet
100 rabbet
105 air gap

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a perspective view of the turkey pot call system 10, according to the preferred embodiment of the present invention is disclosed. The turkey pot call system 10 (herein also described as the "system") 10, provides for the reproduction of audible calls similar to that made by turkeys for the purposes of drawing them out from cover during the hunting process, and includes two (2) main components, the pot call 15 and the striker 20. It is noted that the striker 20 is generally similar to those currently used in the art. The striker 20 includes a striker dowel 25 and a striker head 30 as would be expected. The pot call 15 includes a pot 35 and a striking surface 40 as is visible from this view and are unremarkably indifferent from a conventional turkey call pot with respect to said view.

Figure 2:
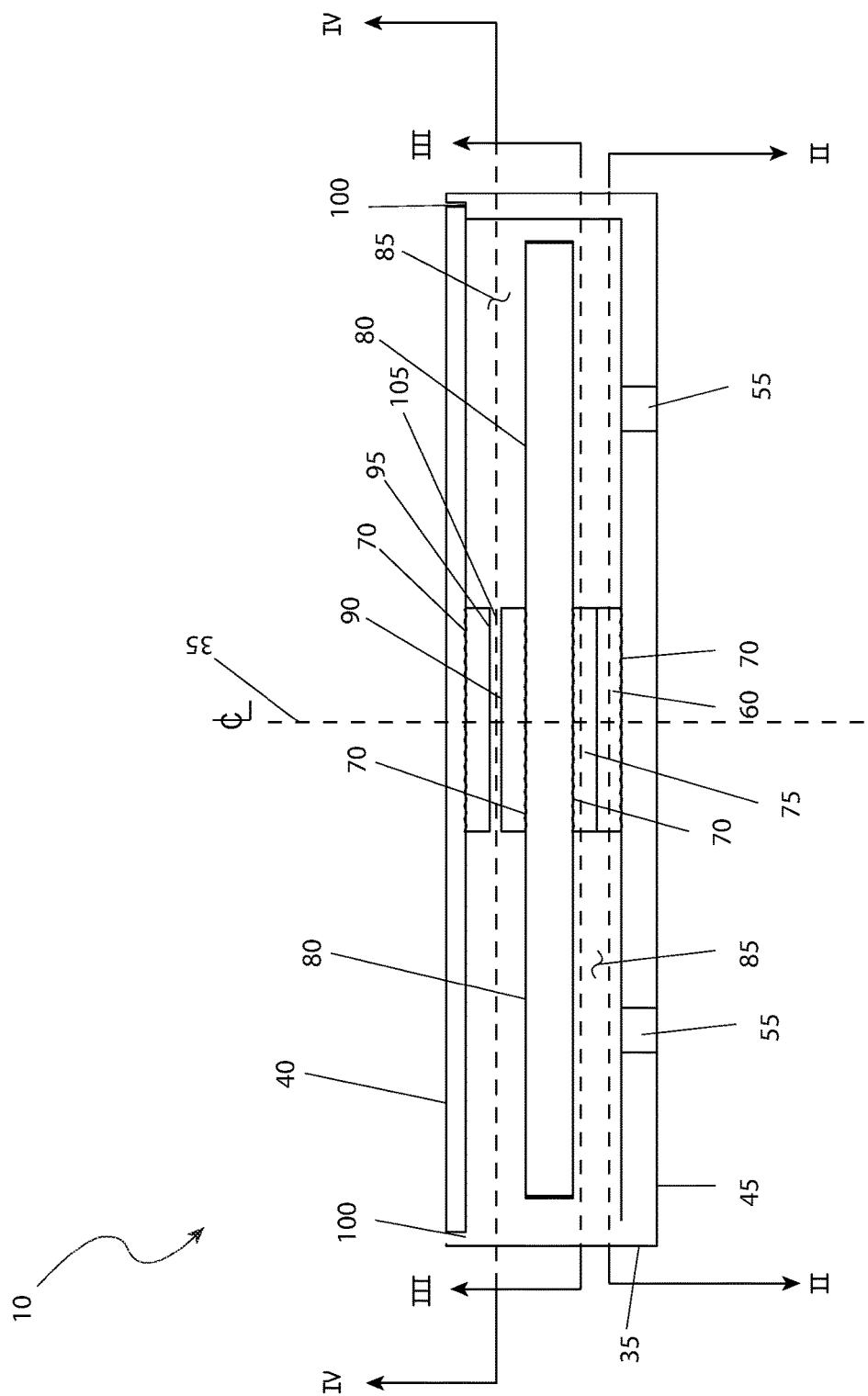
FIG. 2 is a sectional view of the turkey pot call system 10, as seen along a line I-I, as shown in FIG. 1, according to the preferred embodiment of the present invention.

Referring next to FIG. 2, a sectional view of the system 10, as seen along a line I-I, as shown in FIG. 1, according to the preferred embodiment of the present invention is depicted. The pot 35 provides both the bottom 45 and the side 50 of call pot 15. The pot 35 is envisioned to be made from various species of wood, however other materials such as plastic and acrylic may also be used with equal effectiveness. Two (2) of multiple sound holes 55 are visible along the bottom 45 surface to allow for release of produced sounds. A circular disc pot magnet 60 is attached at the pot 35 using adhesive 70. The pot magnet 60 in turn holds a first ferrous disc 75 attached to a first side of a sound card 80 also using first ferrous disc 75. The sound card 80 vibrates within the pot cavity 85 to produce variations in sound produced by the system 10. It is envisioned that the sound card 80 would be manufactured from materials such as glass, copper, aluminum, tin, or the like.

A second ferrous disc 90 is attached to the opposite side of the sound card 80 also using adhesive 70. A striking surface magnet 95 is attached to the underside of the striking surface 40 using adhesive 70 at the center line 65. The striking surface 40 rests within a rabbet 100 formed in the pot 35 at the upper end of the side 50. So as to not affect the tonal quality of the sound produced by the striking surface 40, an air gap 105 is maintained between the second ferrous disc 90 and the striking surface magnet 95, thus holding the striking surface 40 in place by magnetic force against the rabbet 100. However, other sound producing processes may not require the air gap 105 and thus allow the striking surface magnet 95 to rest directly against the second ferrous disc 90. As such, the pot 35, the sound card 80, and the striking surface 40 of the system 10 are held in place only via magnetism produced by the pot magnet 60 and the striking surface magnet 95 and allow for easy disassembly of said components. This feature provides for rapid substitution of different sound card 80 and striking surface 40 within the pot 35 to produce different tonal qualities without the need for a completely different turkey calling device as is the case with conventional calling devices. A few different sound cards 80 and striking surface 40 made of different materials each, can be combined in multiple configurations to produce hundreds of different sounds. This substitution can occur in the field without the need for tools.

Figure 3:
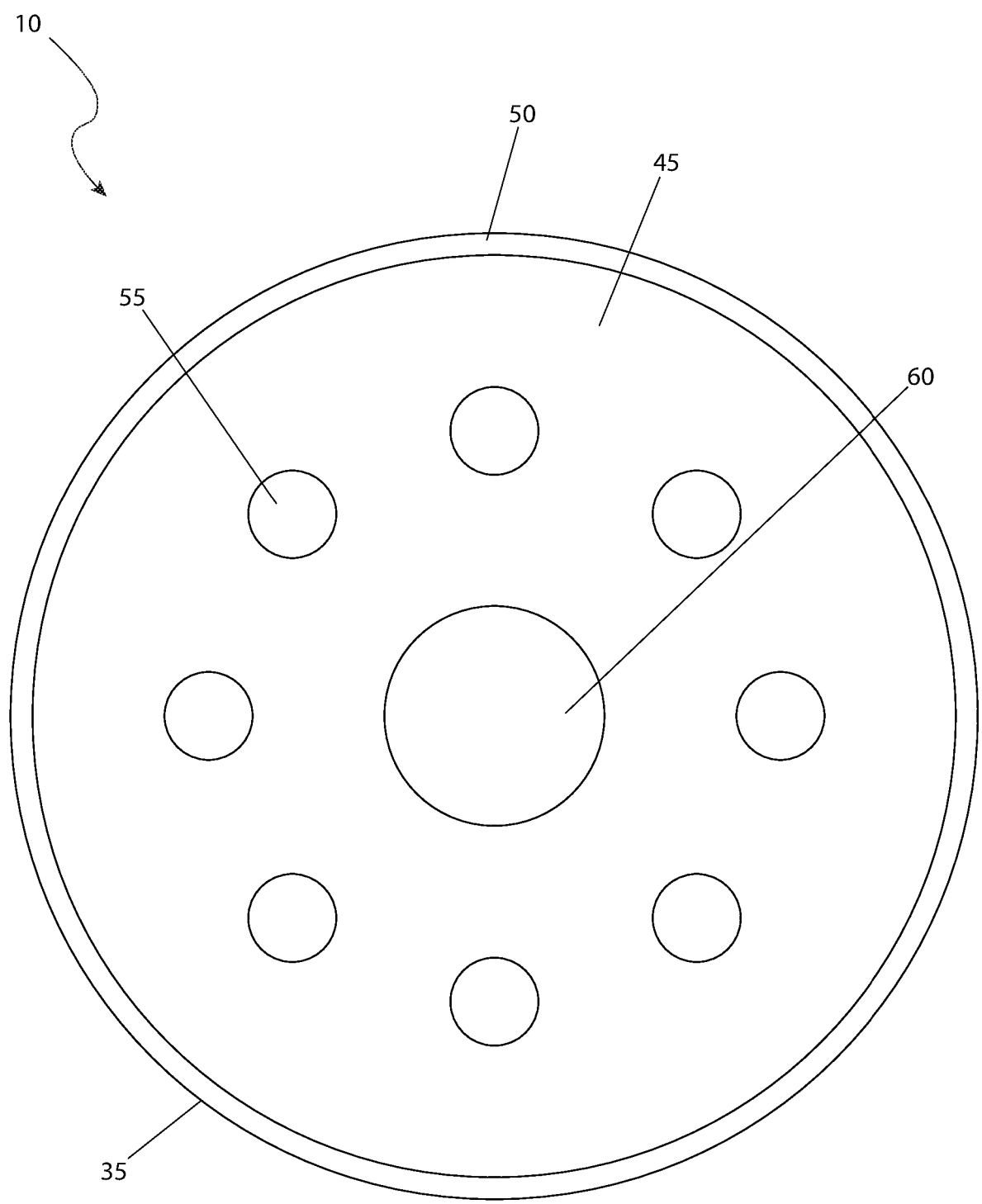
FIG. 3 is a sectional view of the turkey pot call system 10, as seen along a line II-II, as shown in FIG. 2, according to the preferred embodiment of the present invention.

Referring now to FIG. 3 is a sectional view of the system 10, as seen along a line II-II, as shown in FIG. 2, according to the preferred embodiment of the present invention is shown. This view provides clearer configuration details on the placement of the pot magnet 60 at the center of the pot 35. The sound holes 55, of variable quantity, are arranged about the bottom 45. The placement, size, configuration, orientation, shape, and quantity of the sound holes 55 are not intended to be a limiting factor of the present invention. The side 50 of the bottom 45 is visible about the outer perimeter of the pot 35 as shown.

Figure 4:
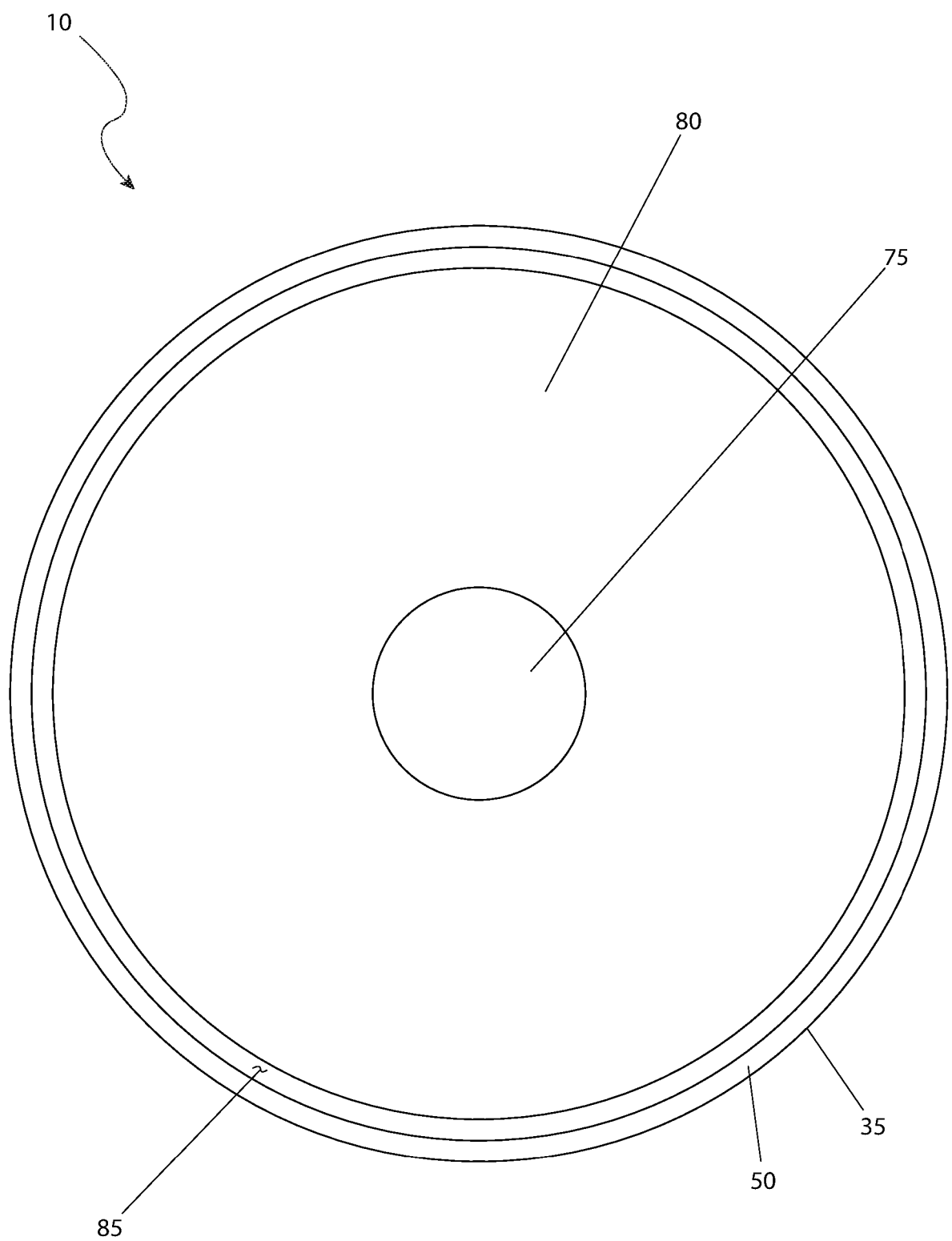
FIG. 4 is a sectional view of the turkey pot call system 10, as seen along a line III-III, as shown in FIG. 2, according to the preferred embodiment of the present invention; and, FIG. 5 is a sectional view of the turkey pot call system 10, as seen along a line IV-IV, as shown in FIG. 2, according to the preferred embodiment of the present invention.

Referring next to FIG. 4, a sectional view of the turkey pot call with magnetic assembly system 10, as seen along a line III-III, as shown in FIG. 2, according to the preferred embodiment of the present invention is disclosed. This view discloses the first ferrous disc 75 positioned at the center of the sound card 80. The side 50 of the pot 35 is visible as well, however isolated from the sound card 80 via the pot cavity 85 and as such, does not physically contact the sound card 80. While this view discloses the underside of the sound card 80, as denoted in FIG. 2, it is understood that the section view from the opposite side of the sound card 80 would result in an identical view.

Figure 5:
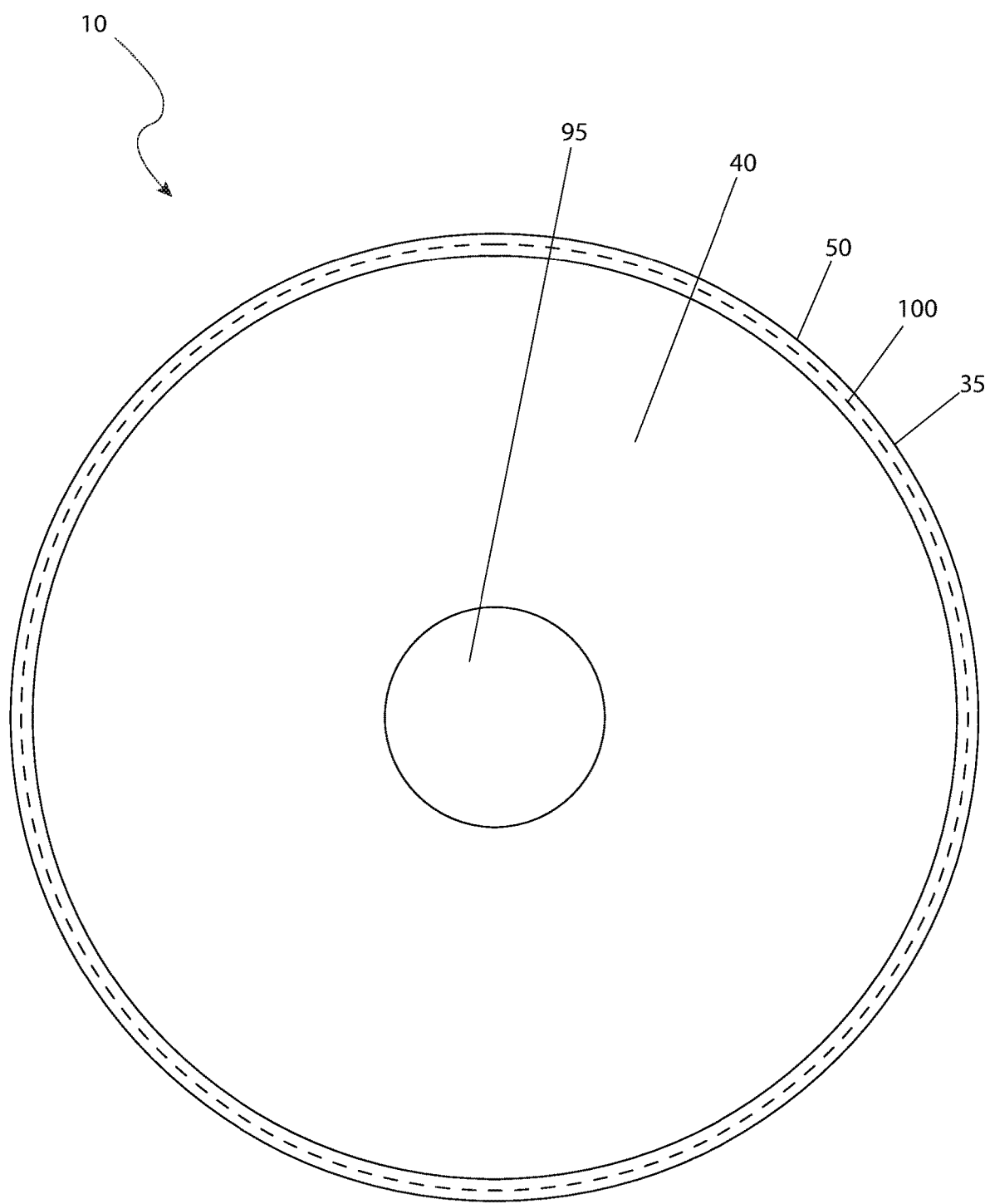

Referring finally to FIG. 5, a sectional view of the system 10, as seen along a line IV-IV, as shown in FIG. 2, according to the preferred embodiment of the present invention is depicted. This view depicts the underside of the striking surface 40 as well as its center mounted striking surface magnet 95. The striking surface 40 rests within the rabbet 100 (here shown by hidden dashed lines) of the side 50 of the pot 35. It is envisioned that the striking surface 40 would be manufactured from slate, glass, crystal, or similar material.

It is noted that all materials of construction of the system 10, particularly the pot 35, the striking surface 40, and the sound card 80 may be varied to produce different tonal sounds. As such materials of construction utilized with the system 10 are not intended to be a limiting factor of the present invention.

2. OPERATION OF THE PREFERRED EMBODIMENT

Over the years, modern advances in hunting equipment have enhanced the sport, providing hunters with increased success. Among these products, hunting game calls, particularly turkey calling pots, have become more realistic, produce a wide range of calls such as yelps, clucks, and purrs. Said calls use a wide range of material in the striking surface such as glass, slate, crystal or many others. The sound card inside of the pot call can also be made of many different materials such as wood, aluminum, copper, tin, or the like. All of these variations in material will result in different tonal qualities which may appeal to one turkey but not another. Thus, in order to attract the maximum number of turkeys, hunters may be required to carry dozens of different pot calls. This is obviously not an effective way to call turkeys and hunt them when under adverse field conditions. Accordingly, there exists a need for a means by which the various materials of multiple components that comprise a turkey pot call can be readily changed in the field to produce the maximum range of tonal qualities to address the above described problem with current conventional turkey pot calls. The development of the turkey pot call with magnetic assembly system 10 fulfills this need.

The preferred embodiment of the present invention can be utilized by the common user in a simple and effortless manner with little or no training. It is envisioned that the system 10 would be constructed in general accordance with FIG. 1 through FIG. 5. The user would procure the system 10 from various procurement channels such as hunting supply and outfitter stores, mail order or internet houses, or via kit format for construction by the final user.

After procurement and prior to utilization, the system 10 would be prepared in the following manner: the desired sound card 80 would be placed in the pot 35 and secured together by magnetism between the pot magnet 60 and the first ferrous disc 75; next the desired striking surface 40 would be placed in the rabbet 100 of the pot 35 and secured together by magnetism between the second ferrous disc 90 and the striking surface magnet 95, noting that an air gap 105 may or may not be produced. At this point in time, the system 10 is ready to use.

During utilization of the system 10, the following procedure would be initiated: the user rubs the striker head 30 of the striker 20 against the striking surface 40 while holding it like a pencil in an upright position to produce various sounds. Such action is identical to that used with conventional turkey call pots and thus no new learning is required. Should a variation in tonal quality be desired, the striking surface 40 and/or the sound card 80 may be replaced by simply lifting them away and replacing one (1) or both of them with one (1) made of a different tool. Such replacement is possible by simple separating them via hand force that overcomes the force of the pot magnet 60 and the striking surface magnet 95. Re-assembly follows the procedure as aforementioned described. After use of the system 10, it is simply stored away until needed again in a repeating and cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A turkey pot call system, comprising:
   a pot call including a pot and a striking surface, the pot provides for a bottom and a side of the pot call to create a pot cavity;
   a striker including a striker dowel and an elongated striker head;
   a circular disc pot magnet having a bottom and a top, the bottom of the circular disc pot magnet is coupled at a bottom of the pot, the top of the circular disc pot magnet is coupled to a first ferrous disc attached to a first side of a sound card;
   a second ferrous disc attached to an opposite side of the sound card;
   a striking surface magnet attached to the underside of the striking surface at the center line, the striking surface rests within a rabbet formed in the pot at the upper end of the side; and
   an air gap maintained between the second ferrous disc and the striking surface magnet without affecting tonal quality of the sound produced by the striking surface;
   a pair of sound holes visible along the bottom surface to allow for release of produced sounds;
   wherein the pot, the sound card, and the striking surface of the turkey pot call system are held in place only via magnetism produced by the pot magnet and the striking surface magnet and to allow for easy disassembly of the pot, the sound card, and the striking surface of the turkey pot call system;
   wherein the pot, the sound card, and the striking surface of the turkey pot call system provides for rapid substitution of the sound card and the striking surface within the pot to produce different tonal qualities without the need for a different turkey calling device; and
   wherein the pot is made of material selected from the group consisting of one of a plurality of woods, plastic, acrylic, or crystal.

2. The turkey pot call system according to claim 1, wherein the turkey pot call system provides for reproduction of audible calls for drawing turkeys out from cover during hunting.

3. The turkey pot call system according to claim 1, wherein the striking surface is made of slate.

4. The turkey pot call system according to claim 1, wherein the striking surface is made of glass.

5. The turkey pot call system according to claim 1, wherein the circular disc pot magnet is attached at the pot using adhesive.

6. The turkey pot call system according to claim 1, wherein the sound card vibrates within the pot cavity to produce variations in sound.

7. The turkey pot call system according to claim 1, wherein the sound card is made of glass.

8. The turkey pot call system according to claim 1, wherein the sound card is made of copper.

9. The turkey pot call system according to claim 1, wherein the sound card is made of aluminum.

10. The turkey pot call system according to claim 1, wherein the sound card is made of tin.

11. The turkey pot call system according to claim 1, wherein the second ferrous disc is attached with adhesive.

12. The turkey pot call system according to claim 1, wherein the striking surface magnet is attached to the underside of the striking surface at the center line using adhesive.

* * * * *